(No Model.) 3 Sheets—Sheet 1.
H. RICHARDSON.
AUTOMATIC WEIGHING AND PACKAGE FILLING MACHINE.
No. 590,530. Patented Sept. 21, 1897.
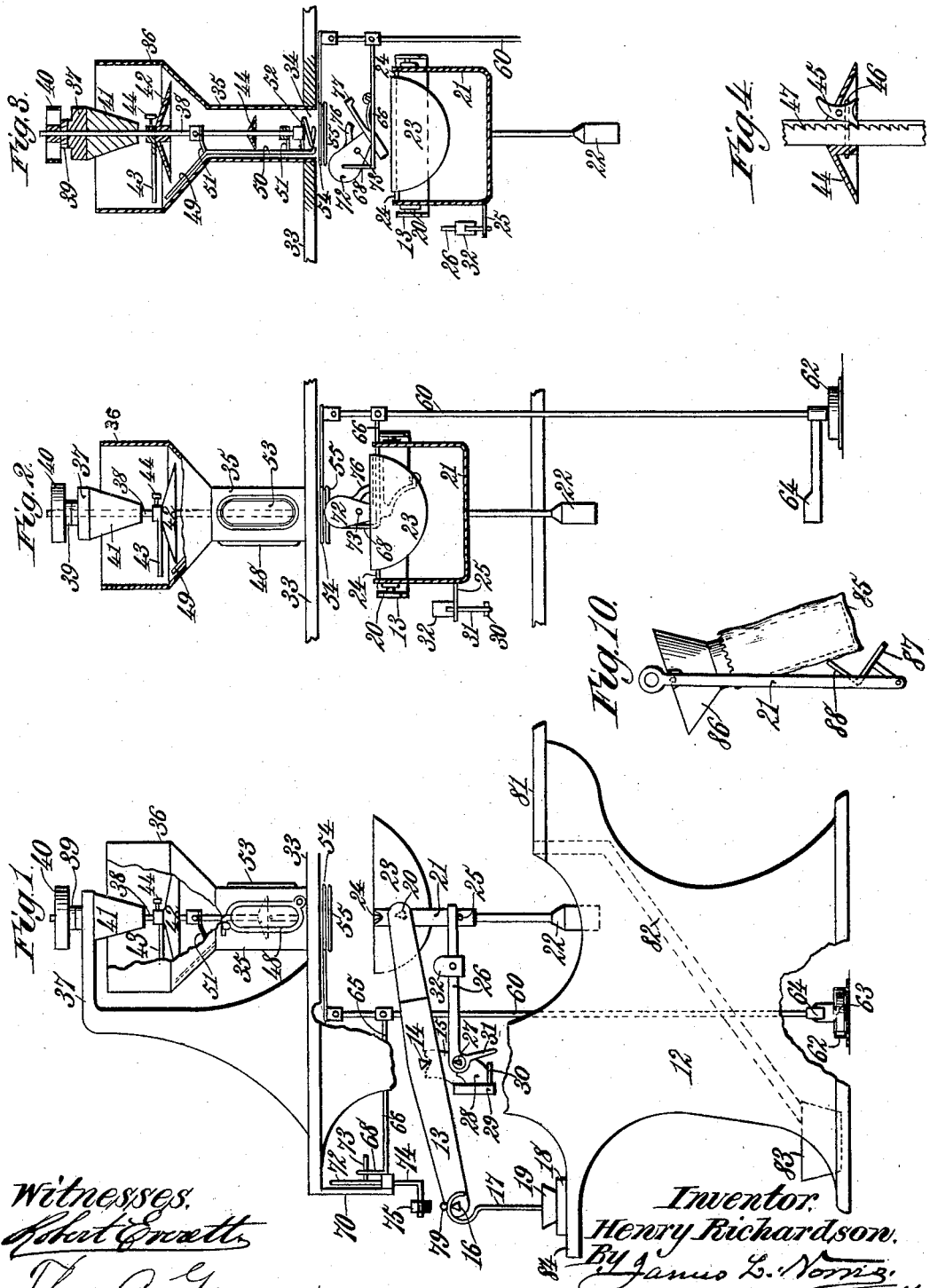
Witnesses.
Robert Emett
Thos. A. Gunn
Inventor.
Henry Richardson.
By James L. Norris
Atty.

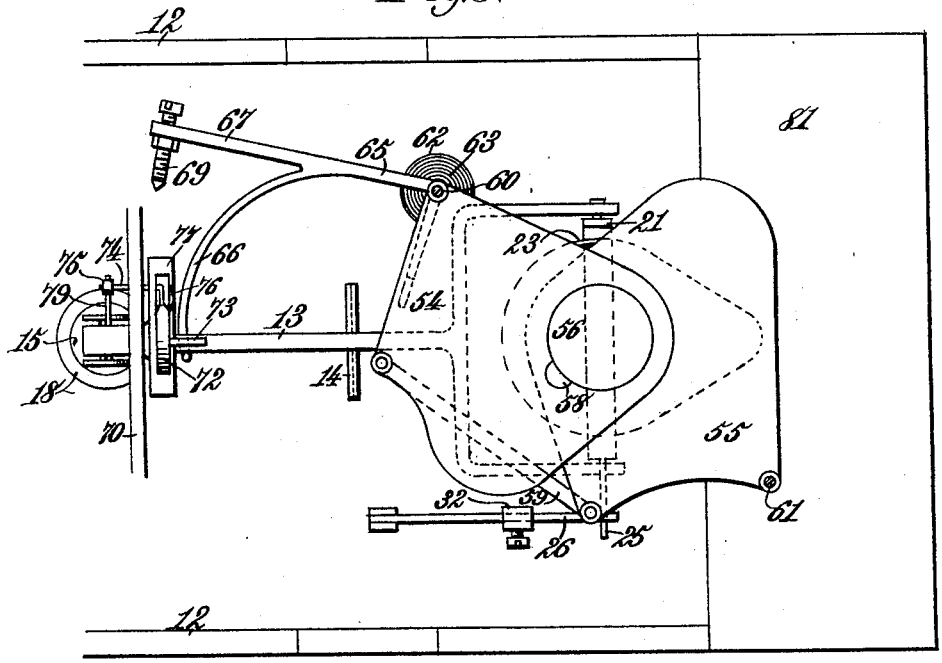
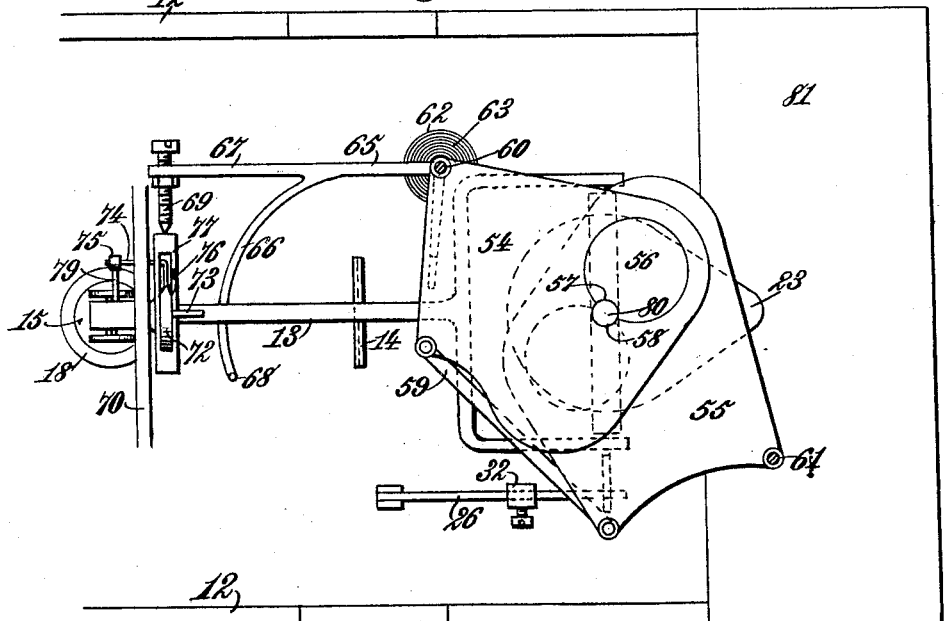

(No Model.) 3 Sheets—Sheet 3.
H. RICHARDSON.
AUTOMATIC WEIGHING AND PACKAGE FILLING MACHINE.
No. 590,530. Patented Sept. 21, 1897.
Fig. 7.
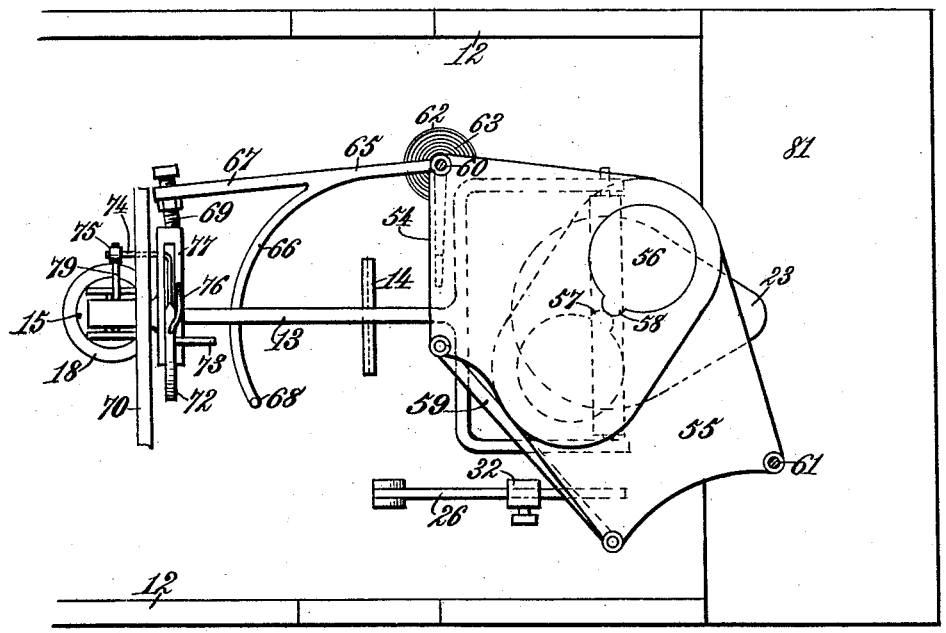
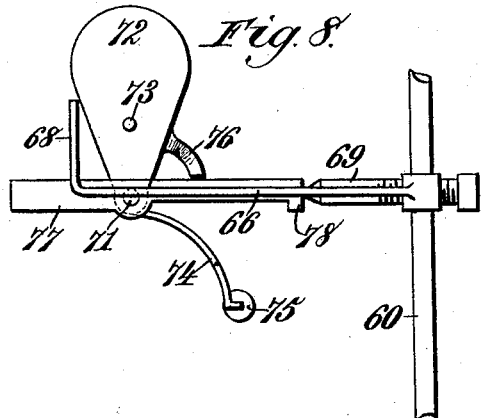
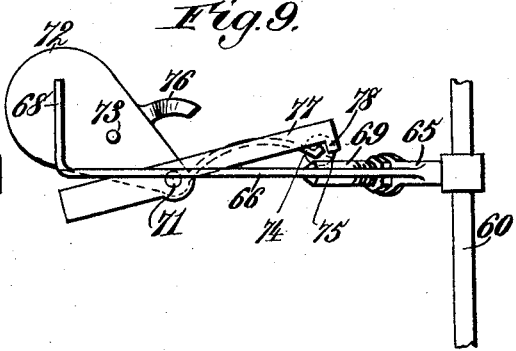
Witnesses.
Robert Emmett
Thos. A. Gunn
Inventor:
Henry Richardson.
By James L. Norris.
Atty.

UNITED STATES PATENT OFFICE.

HENRY RICHARDSON, OF LICHFIELD, ENGLAND.

AUTOMATIC WEIGHING AND PACKAGE-FILLING MACHINE.

SPECIFICATION forming part of Letters Patent No. 590,530, dated September 21, 1897.

Application filed October 24, 1895. Serial No. 566,767. (No model.)

*To all whom it may concern:*

Be it known that I, HENRY RICHARDSON, a subject of the Queen of Great Britain, residing at Lichfield, Staffordshire, England, have invented new and useful Improvements in Automatic Weighing and Package-Filling Machines, of which the following is a specification.

My invention relates to improvements in automatic weighing and package-filling machines; and its objects are to provide an improved measuring or supply tube mechanism; also, an improved arrangement of mechanism whereby the supply of material to be weighed is accurately and automatically regulated for full charging, reduced or dribble supply, and for cut-off; also, an improved arrangement of compensating lever through which the weighing-beam is allowed to assume a perfectly free horizontal position at the final moment of cut-off; and the invention further comprises other improvements in the combination and arrangement of the parts of an automatic weighing and package-filling machine, as hereinafter set forth.

In the annexed drawings, illustrating the invention, Figure 1 is a side elevation of my improved weighing-machine, a portion of the frame and a portion of the hopper being broken away. Fig. 2 is a partly-sectional front or end elevation of the weighing-machine with the sides of the machine-frame removed and showing the position of a catch-lever and tripping device before the weighing is quite completed. Fig. 3 is a similar view with the feed-hopper and measuring-tube wholly in section and showing the catch-lever tripped to permit a complete cut-off by automatic closing of the sluice-gates. Fig. 4 is an enlarged sectional view of the regulating-disk and means for its vertical adjustment. Fig. 5 is a detail plan view with feed-hopper removed and showing the feed-aperture of the sluice-gates full open. Fig. 6 is a similar view showing the sluice-gates shifted so as to reduce the charging or feed aperture to a dribble. Fig. 7 is a similar view showing the sluice-gates still further shifted to effect a complete cut-off. Fig. 8 is an enlarged detail view of the catch-and-tumbler or tripping mechanism for controlling the sluice-gates, as seen, for instance, when giving the dribble discharge. Fig. 9 shows the catch-and-tumbler mechanism when tripped to release the sluice-gates and permit a complete cutting off of the supply of material to be weighed. Fig. 10 is a view of a packing-filling device to take the place of a weigh-pan or scoop when material is to be weighed into a package.

Referring to the drawings, the number 12 designates the frame of the machine, constructed of any suitable materials, but which answers very well when made of wood. It may be arranged to accommodate two or more weighing apparatus, only one of which, however, is here shown and described.

The weighing-beam 13 is provided with suitable knife-edge supports 14, for which bearings 15 are arranged on the machine-frame. From a knife-edge 16 on one end of the beam 13 is suspended a rod 17, Fig. 1, carrying a weight-pan 18, on which a removable weight or weights 19 will be placed. The front end of the beam is forked, as indicated in Figs. 5, 6, and 7, and from knife-edges 20 between the arms of the beam-fork is suspended a cradle 21, the vertical position of which is assured by means of a weight 22, suspended therefrom. Upon the cradle 21 is carried a weigh-pan 23, preferably having lugs 24 to engage notches in the top of the cradle, or the pan may be carried by or supported on the cradle in any convenient manner. Instead of this weigh-pan I may employ a flat platform or other suitable contrivance, according to the character of the material to be weighed. When weighing directly into a package, the weigh-pan 23 may be replaced by a funnel or package-filling device of the nature hereinafter described.

On one side of the cradle 21 is a laterally-extended pin or projection 25, through which a compensating lever 26 exerts its force upon the weigh-beam 13 and attached cradle 21 until the weigh-pan 23 has received nearly the required quantity of material, less the small quantity to be supplied by the dribble. The compensating lever 26 is supported at one end on a knife-edge 27, mounted on a bracket or bearing 28, Fig. 1, on a bar 29, from which the weigh-beam bearings 15 may be also supported. The bar 29 also supports a forward-projecting stop-pin 30 for contact of a tail 31, depending from the pivotal or fulcrumed end of the compensating lever. The other end of the compensating lever 26 is adapted to bear down on the pin or projection 25 of the cradle 21, as above indicated. Upon the compensating lever 26 is mounted an adjustable weight 32, the preponderating portion of which is placed above the horizontal line of the bearings at 27, so that as the said lever is lowered in the weighing operation the center of gravity of the weight 32 in its circular movement travels slightly outward, as well as downward, and thereby exerts an accelerating force which serves as a source of power for causing the closing of the sluice-gates, as hereinafter explained. When this lever 26 has descended a sufficient distance, its tail end 31 comes in contact with and rests against the stop 30, and thus ceases to exert any action on the weigh-beam 13, so that as soon as the beam has reached its horizontal position or immediately preceding its arrival at a horizontal position it is quite free and independent of the compensating lever 26, and the accuracy of the weighing is then readily perceived on the perfectly free horizontal beam.

In the top 33 of the machine-frame is an opening 34, Fig. 3, in which is secured the lower open end of a measuring-tube 35, which is preferably square in cross-sectional area, but may be of any other desired shape. The upper open end of the measuring-tube 35 is continuous with the coned-down or inclined bottom of a hopper 36, through which is introduced the material to be weighed. In a bracket-arm 37, overhanging the hopper 36, is provided a bearing for a vertical rotary shaft 38, that is supported wholly by a collar 39 near its upper end. This vertical shaft 38 is mounted centrally in the hopper 36 and measuring-tube 35, but has no bearing at its lower end, so as not to obstruct the feed of material through said tube. On the upper end of the shaft 38 is secured a pulley 40, through which the shaft may be driven by belting from any suitable motor. The shaft 38 is preferably provided beneath the bracket-arm 37 with an elongated conoidal collar 41, the enlarged upper end of which has a broad bearing in contact with the under side of said bracket-arm to steady the shaft and prevent it from rising or jumping. By its downward and inward taper the conoidal collar 41 also assists the feed of material through the hopper. Below the collar 41 there is secured to the vertical shaft 38 a feed-disk 42, the upper side of which is coned to facilitate free passage of material to and over its periphery and thence through the lower conical portion of the hopper and into the measuring-tube. By the rotation of the feed-disk 42 a somewhat spiral movement is imparted to the material in the hopper and its feed thereby accelerated. There may also be provided a horizontally-projecting stirrer-arm 43, adjustably secured to the shaft 38 by means of a set-screw 44 above the feed-disk. On that part of the vertical shaft 38 which is inclosed by the measuring-tube 35 there is mounted a vertically-adjustable regulating-disk 44, Figs. 3 and 4, having a coned upper surface. The vertical adjustment of the regulating-disk 44 may be accomplished in any suitable or convenient manner, that which is illustrated in Fig. 4 answering well, in which 45 represents a catch pivoted in the disk and arranged to be held by a spring 46 in engagement with any one of a number of notches 47 provided on the shaft. In one side of the measuring-tube 35 is a hinged door 48, through which access is afforded for adjusting the regulating-disk 44 up or down. Thus according to the quantity of material to be weighed into one lot or package the disk is to be adjusted—that is to say, if a larger quantity is to be weighed the disk 44 will be raised higher and if a smaller weight is required the disk 44 will be lowered. The area of the disk 44 is somewhat smaller than the interior diameter of the tube 35, its size being determined by the nature of the material to be weighed, whether coarse or fine. The coned upper side of the disk 44 directs the material to and over the periphery of the disk to the measuring-space in the lower part of the tube 35, the capacity of which is regulated by vertical adjustment of said disk, as above described. The revolving feed-disk 42 and stirrer-arm 43 effect a constant flow of material downward onto the regulating-disk 44 and thence to the lower part of the measuring-tube.

It is found that in feeding from a hopper such fine material as flour, for instance, there is a tendency for the material to arch or form a dome-like accumulation that obstructs the flow and will finally cause it to cease unless the arch or dome is broken up as fast as formed. To effect this purpose, there may be provided the vertically-arranged stirring-blades 49 and 50, carried by arms 51, projecting from the vertical shaft 38 above and below the regulating-disk. The stirring-blade 49 is inclined outward to conform to the contour of the coned bottom of the hopper 36 and break any arch of material that might form at the inlet to the measuring-tube. The lower end of the stirring-blade 50 is slightly crooked and will break any arch or dome of material at the outlet of the measuring-tube.

In addition to the stirring-blades 49 and 50 or in lieu thereof, according to the nature of the material fed to the measuring-tube, I prefer to secure to the lower end of the vertical rotary shaft 38 an involute spiral stirrer 52, Fig. 3, which occupies the lower end of the measuring-tube. This spiral stirrer 52 is revolved in a lifting direction, so that its tendency is to lift the material, but in so doing it clears a central downward passage and throws over the disturbed and freed material from about its top into and through the center and thence through the opened sluice-gates, thereby insuring a constant free discharge and preventing any inclination to clog. In the measuring-tube 35 is a glazed window 53, through which the attendant may observe when the space between the measuring-disk 44 and the sluice-gates 54 55 is charged.

The sluice-gates 54 and 55 are similar in construction and operation to others used in this class of machines—that is to say, they consist of two plates, each provided with an orifice 56 and adapted to be moved one over the other. The orifice 56 in each sluice-plate is in the main circular in shape, but in the edge of each orifice is a small semicircular notch, as 57 or 58, the notch 57 in one sluice-plate being situated diametrically opposite the notch 58 in the other plate. The sluice gates or plates 54 and 55 are connected by a lever 59, Figs. 5, 6, and 7, so arranged that in their operation both plates will have a swinging movement simultaneously about their respective pivots 60 and 61 to separate the orifices 56 or cause them to coincide at a point beneath the measuring-tube 35, and thus permit escape of its contents to the weigh-pan.

One of the sluice-gates, as 54, is connected at its pivoted point to a vertical shaft 60, Figs. 1, 2, and 3, that may have a bearing at its upper end in the frame-top 33 and at its lower end in a box 62, containing a spring 63, Fig. 1, that is attached to said shaft. This spring 63 normally exerts a force to rotate said shaft in such direction as to swing the sluice-gates 54 and 55 in a direction that will move the orifices 56 apart, as shown in Fig. 7, and thus close the gates to cut off or prevent a feed to the weigh-pan. The shaft 60 is provided near its lower end with a foot-lever 64, through which the shaft may be rotated against the action of the spring 63 to open the sluice-gates when required. To the vertical and rotatable shaft 60 is also secured a lever 65, having arms 66 and 67, the arm 66 being provided at its end with an upstanding pin or projection 68, Figs. 8 and 9, while the arm 67 has an adjustable pin or screw 69 projecting laterally therefrom. The frame-top 33 may be provided with a depending portion 70, Fig. 1, to which is fulcrumed at 71, Figs. 8 and 9, an overbalancing-lever 72, furnished on one side with an outstanding pin 73 and having also a tail part 74, on the end of which a small roller 75 may be carried. One edge of the overbalancing-lever 72 may be provided with an arm 76, adapted to bear upon and set a catch-lever 77, that is fulcrumed at 71 and provided with a downward-projecting catch-lug 78 at one end. When the catch-lever 77 is in a horizontal position, it will afford a stop for the end of the adjustable pin or screw 69, as shown in Figs. 6 and 8, to hold the sluice-gates in such position that only a small quantity of material will be allowed to dribble to the weigh-pan. The volume of the dribble may be regulated by proper adjustment of the pin or screw 69, so that a finer or more copious dribble may be obtained, as required. When the weighing is nearly completed, the catch-lever 77 will be automatically tripped and the sluice-gates thereby released through the action of an outstanding peg 79, Figs. 1, 5, 6, and 7, carried by the weigh-beam 13 in position to come in contact with the roller 75 on the tail part 74 of the overbalancing-lever 72, which is thus thrown over, as shown in Fig. 9, a sufficient distance to remove the arm 76 from the upper surface of said catch-lever 77 and carry the tail 74 into tripping engagement with the shoulder formed by the lug 78 on the end of the catch-lever.

In using the machine the material to be weighed is poured into the hopper 36, and by action of the rotary stirrers and feed devices it will find its way down beneath the regulating-disk 44 without clogging or arching at any point. Through the glazed window 53 the attendant may readily observe when the space between the sluice-gates and the regulating-disk is charged. By means of the foot-lever 64 the shaft 60 will then be rotated in a direction to throw the sluice-gates 54 and 55 full open, as shown in Fig. 5, until the charge below the regulating-disk 44 is emptied, the revolutions of the spiral stirrer 34, Fig. 3, meanwhile serving to prevent any arching or clogging of the material at the outlet from the measuring-tube. The foot-lever 64 will now be released and by action of the spring 63 the shaft 60 will be turned backward until the sluice-gates assume the position shown in Fig. 6, in which only a small quantity of material is allowed to dribble through the small aperture at 80, formed by the fully-coinciding notches in the otherwise closed orifices of the sluice gates or plates. When the sluice gates or plates are turned to this position, they are prevented from closing fully by reason of the engagement between the pin or screw 69 and the catch-lever 77, as shown in Figs. 6 and 8, the required volume of dribble to finally adjust the weighing being accurately regulated by the adjustment previously given to said pin or screw 69, according to the fineness or coarseness of the material handled and the volume of dribble required. As before intimated, the weighted compensating lever 26 is at this part of the operation still exerting its force upon the beam 13 through the cradle 21 in addition to the weight of the delivered material in the weigh-pan 23, and this continues until the outstanding peg 79 upon the said weigh-beam comes in contact with the roller 75 on the tail part 74 of the overbalancing-lever 72, whereupon said lever is tilted and its momentum causes the tail 74 to suddenly engage the catch-lever 77 and lift it free from bearing-contact with the pin or screw 69, as shown in Fig. 9, thus allowing the lever 65 and connected sluice-gates 54 and 55 to move forward under continued action of the spring 63 and completely close the said sluice-gates, as shown in Fig.

7, at the exact moment that the correct quantity of material has been delivered to accurately complete the weighing.

Immediately preceding the beam 13 reaching an exact horizontal position the tail part 31 of the compensating lever 26 will come to rest against the stop 30, Fig. 1, and so the said compensating lever will instantly cease to act on the weigh-beam except as to the impetus already given. Thus at the actual completion of the weighing the beam 13 is perfectly free in its horizontal position, as though the weighing was being effected in an ordinary weigh-beam machine.

The weighing operation being now complete, the packet or the material is removed and by pressure against the foot-lever 64 the sluice-gates 54 and 55 may be again opened, as shown in Fig. 5, for a repeat weighing, as before described. In thus reopening the sluice-gates the peg or pin 68 on the lever-arm 66 engages the peg or pin 73 on the tilted overbalancing-lever 72, Fig. 3, and causes said lever 72 to again assume its vertical position and reset the catch-lever 77 through the action of the arm 76 thereon, the position of the mechanism being now as shown in Fig. 5. By now releasing the foot-lever 64 a repeat operation of weighing automatically takes place.

At the front portion of the machine-frame 12 there may be placed a shelf 81, from below which there is arranged a rearward-sloping board 82, Fig. 1, that serves to direct any overflow or waste material into a suitable receptacle 83, removably placed on the base of the machine. A shelf 84, Fig. 1, may be arranged at the rear of the machine-frame to support the weight-pan 18 while no material is being weighed.

In Fig. 10 I have shown a form of package-filling device that may be substituted for the weigh-pan 23 to permit a direct weighing of material into a paper bag, as 85, or like cheap and light receptacle. This package-filling device comprises a funnel 86 to be pivotally supported in the cradle or frame 21 in such manner as to permit slipping the bag 85 onto the funnel-tube. A pivotally-supported bottom or bag-holder 87 is provided to hold the bag on the funnel 86 when returned to its normally vertical position beneath the feed mechanism. If desired, the bottom or holder 87 may be provided with a back piece or guard 88, as shown. Other package-filling devices may also be readily adapted to the weighing-machine.

What I claim as my invention is—

1. In a weighing-machine, the combination with the feed-hopper and measuring-tube, a vertical rotary shaft mounted in said hopper and tube and supported only from the top, and sluice-gates for controlling the outlet from said tube, of a regulating-disk vertically adjustable on said shaft, substantially as described.

2. In a weighing-machine, the combination with the measuring-tube, and vertical rotary shaft therein, of a regulating-disk adjustable on said shaft, and a spiral stirrer carried on the lower end of said shaft and adapted to exert, in its revolutions, a lifting action on the material in the measuring-tube below said disk, to prevent arching and clogging, substantially as described.

3. In a weighing-machine, the combination with the feed-hopper and measuring-tube, and the vertical rotary shaft mounted in said hopper and tube, of a feed-disk carried on said shaft at a point within the hopper and the stirrers and vertically-adjustable regulating-disk mounted on said shaft below the feed-disk, substantially as described.

4. In a weighing-machine, the combination with the feed-hopper and measuring-tube, a vertical rotary shaft in said hopper and tube, and sluice-gates controlling the outlet from the measuring-tube, of feed devices located on said shaft within the hopper, a vertically-adjustable regulating-disk carried on said shaft within the measuring-tube, and a spiral stirrer attached to the lower end of said shaft at the outlet from the measuring-tube, substantially as described.

5. In a weighing-machine, the combination of the feed-hopper, the measuring-tube leading from said hopper and provided with a door and a glazed window, a vertical rotary shaft centrally mounted in said hopper and tube, feed devices and stirrers carried by said shaft, a vertically-adjustable regulating-disk mounted on said shaft within the measuring-tube, and sluice-gates for controlling the discharge from said measuring-tube, substantially as described.

6. In a weighing-machine, the combination with feed mechanism, a weighing-beam, and sluice-gates for controlling the discharge from the feed mechanism to a receptacle supported from the weigh-beam, of a vertical shaft through which the sluice-gates are operated, a spring connected with said shaft for normally actuating it in a direction to close the sluice-gates, a foot-lever for actuating said shaft in a direction to open the sluice-gates, a lever carried by said shaft and having one arm provided with an upstanding pin or projection and another arm provided with a horizontally-projecting and adjustable pin or screw, a catch-lever adapted to engage said adjustable pin or screw and hold the sluice-gates open at a dribble, and tripping mechanism comprising an overbalancing-lever adapted to be set by the upstanding pin or projection on the lever carried by said shaft and having a tail part to be actuated from the weigh-beam to cause the lifting of the catch-lever and release of the sluice-gates to permit a full cut-off, substantially as described.

7. In a weighing-machine, the combination with feed mechanism, the sluice-gates, and automatically-actuated catch mechanism for arresting the closing of the sluice-gates at a point to permit only a dribble feed, of a lever actuated through the sluice-operating mechanism and carrying an adjustable pin or screw adapted to be engaged by the said catch mechanism and capable of adjustment to regulate the volume of the dribble, substantially as described.

8. In a weighing-machine, the combination with feed mechanism, the sluice-gates actuated through a vertical shaft, and a weighing-beam provided with a pin or projection, of a catch-lever for arresting the closing of the sluice-gates at a point to permit only a dribble feed, a lever carried by the sluice-actuating shaft and having an arm provided with an adjustable pin or screw to engage the said catch-lever and regulate the volume of the dribble and another lever-arm provided with an upstanding pin, and an overbalancing-lever provided with a pin to be engaged to set the said overbalancing-lever which is also provided with an arm to set the catch-lever and with a tail to be engaged by the pin or projection on the weigh-beam and cause the tripping of the catch-lever, substantially as described.

9. In a weighing-machine, the combination with feed mechanism, and a weighing-beam, of a cradle or frame suspended from one end of the weigh-beam, a package-filling funnel pivotally supported in said cradle and a pivotally-supported bottom or holder for the bag placed on said funnel, substantially as described.

10. In a weighing-machine, the combination of the feed mechanism, the sluice-gates, catch mechanism for holding the sluice-gates open at an adjustably-regulated dribble, the weighing-beam, devices actuated from the weighing-beam to automatically trip the catch mechanism and close the sluice-gates at completion of the weighing, an adjustably-weighted compensating lever having a tailpiece at one end and arranged at its other end to exert a force on the weighing-beam until the weighing is nearly completed, the weight on said lever being arranged with a preponderating portion above the level of the lever-fulcrum whereby the center of gravity of said weight will be shifted outward with the downward-swinging movement of the lever to exert an accelerating action for the tripping of the catch mechanism and closing of the sluice-gates, and a stop for the tailpiece of said lever to prevent further action of the said lever on the weighing-beam and leave said beam in a free horizontal position at completion of the weighing, substantially as described.

In testimony whereof I have hereunto set my hand in presence of two subscribing witnesses.

HENRY RICHARDSON.

Witnesses:
   JAMES L. NORRIS,
   THOMAS A. GREEN.